US010509957B2

(12) United States Patent
Zhang et al.

(10) Patent No.: US 10,509,957 B2
(45) Date of Patent: Dec. 17, 2019

(54) SYSTEM AND METHOD FOR HUMAN POSE ESTIMATION IN UNCONSTRAINED VIDEO

(71) Applicant: University of Central Florida Research Foundation, Inc., Orlando, FL (US)

(72) Inventors: Dong Zhang, Orlando, FL (US); Mubarak Shah, Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 93 days.

(21) Appl. No.: 15/425,477

(22) Filed: Feb. 6, 2017

(65) Prior Publication Data
US 2017/0228587 A1  Aug. 10, 2017

Related U.S. Application Data

(60) Provisional application No. 62/291,869, filed on Feb. 5, 2016.

(51) Int. Cl.
*G06K 9/00* (2006.01)
*G06K 9/62* (2006.01)

(52) U.S. Cl.
CPC ..... *G06K 9/00375* (2013.01); *G06K 9/00369* (2013.01); *G06K 9/00744* (2013.01); *G06K 9/6296* (2013.01); *G06K 9/00771* (2013.01)

(58) Field of Classification Search
None
See application file for complete search history.

(56) References Cited

U.S. PATENT DOCUMENTS

| 2013/0271458 A1* | 10/2013 | Andriluka | G06K 9/00342 345/420 |
| 2013/0278501 A1* | 10/2013 | Bulzacki | G06F 3/017 345/157 |
| 2016/0042227 A1* | 2/2016 | Zhong | G06K 9/00342 382/103 |

OTHER PUBLICATIONS

Yang and Ramanan. Articulated pose estimation with flexible mixtures-of-parts. Computer Vision and Pattern Recognition (CVPR 2011). 2011: 1-8.
Ramakrisfina et al., Tracking human pose by tracking symmetric parts. Computer Vision and Pattern Recognition (CVPR 2013). 2013: 3728-3735.
Shotton et al., Real-time human pose recognition in parts from single depth images. Communications of the ACM. 2013. vol. 56 (No. 1): 116-124.
Park and Ramanan. N-best maximal decoders for partmodels. Computer Vision (ICCV 2011). 2011: 1-8.

* cited by examiner

*Primary Examiner* — Idowu O Osifade
(74) *Attorney, Agent, or Firm* — Molly L. Sauter; Smith & Hopen, P.A.

(57) ABSTRACT

A system and method for estimating a sequence of human poses in an unconstrained video. In the present invention, a unified two stage, tree-based, optimization problem is solved for which an efficient and exact solution exists. While the proposed method finds an exact solution, it does not sacrifice the ability to model the spatial and temporal constraints between body parts in the video frames on the unconstrained video.

20 Claims, 5 Drawing Sheets
(5 of 5 Drawing Sheet(s) Filed in Color)

FIG. 4A Tracklet Relational Graph
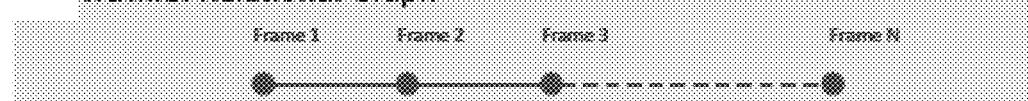
FIG. 4B Single Part Tracklet Hypothesis Graph
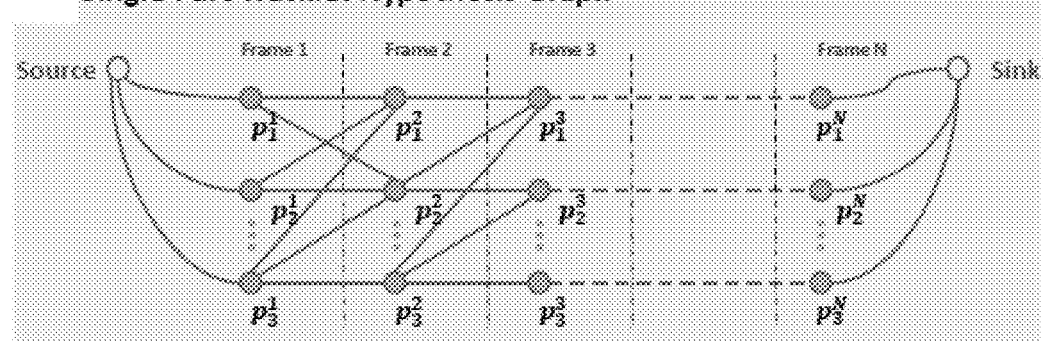
FIG. 4C Coupled Part Tracklet Hypothesis Graph
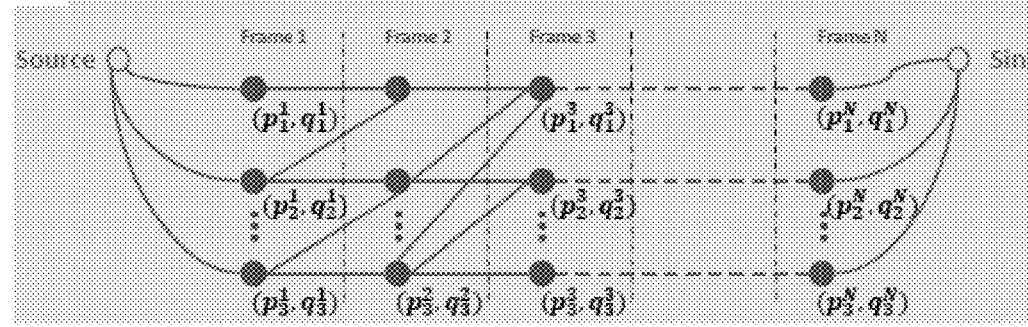

SYSTEM AND METHOD FOR HUMAN POSE ESTIMATION IN UNCONSTRAINED VIDEO

CROSS-REFERENCE TO RELATED APPLICATIONS

This application claims priority to currently U.S. Provisional Patent Application No. 62/291,869 filed on Feb. 5, 2016 and entitled "Human Post Estimation in Unconstrained Video", which is herein incorporated by reference in its entirety.

FIELD OF INVENTION

The present invention is directed to a system and method for estimating a sequence of human poses in one or more unconstrained videos.

BACKGROUND OF THE INVENTION

Human pose estimation is crucial for many computer vision applications, including human computer interaction, activity recognition and video surveillance. It is a very challenging problem due to the large appearance variance, non-rigidity of the human body, different viewpoints, cluttered background, self occlusion, etc. Single image-based pose estimation methods known in the art can be applied to each video frame to generate initial pose estimations and a further refinement through frames can be applied to make the pose estimations consistent and more accurate. However, due to the innate complexity of video date, the problem formulations of most video-based human pose estimation methods are very complex (usually NP-hard), therefore, approximate solutions have been proposed to solve them which result in sub-optimal solutions. Furthermore, most of the existing methods model body parts as a tree structure and these methods tend to suffer from double counting issues, wherein symmetric parts, for instance left and right ankles, are easily mixed together.

Kinect is known in the art as a motion sensing input device that can be used with Microsoft® Xbox 360 and Xbox One video game consoles and with Windows® PCs. Kinect utilizes a webcam-style add-on peripheral that allows users to control and interact with their console/computer without the need for a hand-held game controller. In general, the webcam provides an unconstrained video and the motion sensing input device provides a user interface to the gaming system using human body poses and gestures.

In the computer/digital gaming industries, such as those systems using unconstrained video and motion sensing input devices, it is very important to estimate the human poses to provide a better human-computer interface. Additionally, in the field of video surveillance and action/activity recognition, it is also crucial to be able to estimate human poses in unconstrained video feeds to allow further automatic analysis of the video.

Systems requiring video cameras and complex motion sensing input devices are prohibitively expensive, which severely limits the application of the systems. In addition, other human pose estimation methods known in the art that utilize a standard video camera are mainly designed for the estimation of still images, in contrast with video.

Accordingly, what is needed in the art is a more efficient and cost-effective solution for estimating human poses in unconstrained video.

SUMMARY OF INVENTION

The present invention provides a method to estimate a series of human poses in an unconstrained video requiring only a standard video camera for capturing the video. This is in contrast with the prior art methods, which rely on depth sensors that consist of an infrared laser projector combined with a monochrome CMOS sensor, which captures video in 3D. Eliminating the need for a specialized depth sensor reduces the overall cost of the system, thereby reducing the user's financial investment in the equipment. Additionally, since the present invention is designed for use with any ubiquitous video camera, it is applicable in many more situations thereby expanding its utility into an increasing number of potential markets.

In various embodiments, the present invention provides a method for estimating human poses in an unconstrained video. The method includes, receiving, at a computing device comprising hardware components and software programs, an unconstrained video comprising a plurality of consecutive frames. Following receipt of the video frames, the method further includes, generating a plurality of best full body pose hypotheses for each of the plurality of consecutive frames, extracting a plurality of real body part nodes from each of the plurality of best full body pose hypotheses and generating a real body part hypotheses for each of the plurality of real body part nodes extracted from the plurality of best full body pose hypotheses. The method further includes, combining symmetric real body part nodes to identify a plurality of abstract body part nodes, generating a plurality of abstract body part hypotheses from the plurality of abstract body art nodes and each of the real body part hypotheses, generating an optimal tracklet for each of the abstract body part hypotheses and estimating a human pose in the unconstrained video based upon the abstract body part tracklets using tree-based optimization.

In the present invention, the real body part nodes are selected from head, neck, right elbow, left elbow, right wrist, left wrist, right hip, left hip, right knee, left knee, right foot and left foot. In addition, the abstract body part nodes include abstract single body part nodes and abstract coupled body part nodes, wherein the abstract single body part nodes include, head top and head bottom and the abstract coupled body part nodes include shoulder, elbow, hand, hip, knee and ankle and wherein the each of the abstract coupled body part nodes represents two symmetric ready body parts.

In an additional embodiment, the present invention provides a system for estimating human poses in an unconstrained video, which includes at least one computing device comprising hardware components and software programs for receiving an unconstrained video comprising a plurality of consecutive frames, generating a plurality of best full body pose hypotheses for each of the plurality of consecutive frames, extracting a plurality of real body part nodes from each of the plurality of best full body pose hypotheses and generating a real body part hypotheses for each of the plurality of real body part nodes extracted from the plurality of best full body pose hypotheses. The software of the system is further configured for combining symmetric real body part nodes to identify a plurality of abstract body part nodes, generating a plurality of abstract body part hypotheses from the plurality of abstract body art nodes and each of the real body part hypotheses, generating an optimal tracklet for each of the abstract body part hypotheses and estimating a human pose in the unconstrained video based upon the abstract body part tracklets using tree-based optimization.

In another embodiment, the present invention provides one or more non-transitory computer-readable media having computer-executable instructions for performing a method of running a software program on a computing device, the computing device operating under an operating system, the method including issuing instructions from the software program comprising receiving an unconstrained video comprising a plurality of consecutive frames, generating a plurality of best full body pose hypotheses for each of the plurality of consecutive frames, extracting a plurality of real body part nodes from each of the plurality of best full body pose hypotheses and generating a real body part hypotheses for each of the plurality of real body part nodes extracted from the plurality of best full body pose hypotheses. The computer-readable media further includes instructions for combining symmetric real body part nodes to identify a plurality of abstract body part nodes, generating a plurality of abstract body part hypotheses from the plurality of abstract body art nodes and each of the real body part hypotheses, generating an optimal tracklet for each of the abstract body part hypotheses and estimating a human pose in the unconstrained video based upon the abstract body part tracklets using tree-based optimization.

As such, the present invention provide a more efficient and cost-effective solution for estimating human poses in unconstrained video utilizing the novel concept of abstract body part to represent the symmetrical aspects of the human body poses in unconstrained video frames.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which:

FIG. 4A illustrates the relational graph for the abstract body part tracklet generation in accordance with an embodiment of the present invention.

FIG. 4B illustrates the tracklet hypothesis graph for single body parts, in accordance with an embodiment of the present invention.

FIG. 4C illustrates the tracklet hypothesis graph for coupled body parts, in accordance with an embodiment of the present invention.

DETAILED DESCRIPTION OF THE INVENTION

The present invention provides a method to estimate a sequence of human poses in an unconstrained video. In contrast with the commonly employed graph optimization framework, which is NP-hard (nondeterministic polynomial time-hard) and necessitates approximate solutions, in the present invention, this problem is formulated into a unified two stage, tree-based, optimization problem for which an efficient and exact solution exists. Although the proposed method finds an exact solution, it does not sacrifice the ability to model the spatial and temporal constraints between body parts in the video frames; indeed it even models the symmetric parts better than the existing methods currently known in the art.

One commonly employed methodology for human pose estimation in videos is the graph optimization formulation. There are two types of such formulation. The first type of this formulation is to generate several human pose hypotheses in each frame and select one best hypothesis from each frame, while making sure they are consistent throughout the video. The inference in this approach is very efficient, however, due to the large variations of pose configurations, it is very difficult to get good poses with all body parts correctly estimated. Therefore, a second type of such formulation was introduced to handle each body part separately. In this formulation, hypotheses are generated for each body part in every frame. Following the spatial constraints between body parts in each frame and using temporal consistency of appearances and locations between adjacent frames, the goal is to optimally select the best hypotheses for each body part from all the frames together. This formulation is desirable, since it is able to expand sufficient diverse human pose configurations and it is able to effectively model spatiotemporal constraints between body parts. Despite all the benefits of this formulation, it is an NP-hard problem due to the underlying loopy graph structure (i.e. there are many simple cycles in the graph; e.g. the simple cycles in FIG. 1B induced by the green, blue and red edges). Several methods have been proposed to attack this NP-hard problem in different ways to reduce the complexity induced by interframe simple cycles. However, none of the proposed methods simultaneously exploited the important constraints between body parts (e.g. symmetry of parts) and none of the proposed methods provide an efficient exact solution.

Figure 1A:
FIG. 1A is a diagram illustrating the video image frames used to execute the inventive concept of abstraction and association for human pose estimation, in accordance with an embodiment of the present invention.
Figure 1B:
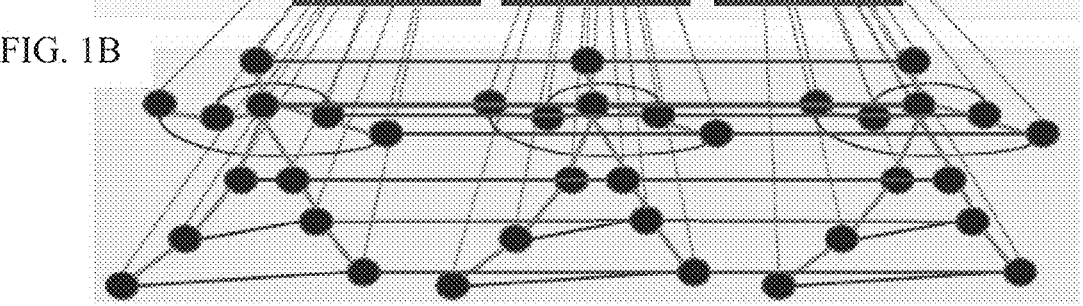
FIG. 1B is a diagram illustrating the body parts in each video image frame and associated edges used to execute the inventive concept of abstraction and association for human pose estimation, in accordance with an embodiment of the present invention.
Figure 1C:
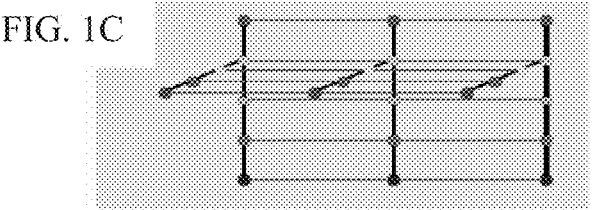
FIG. 1C is a diagram illustrating the concept of abstraction in human pose estimation in videos, in accordance with an embodiment of the present invention.
Figure 1D:
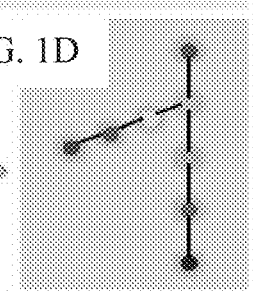
FIG. 1D is a diagram illustrating the concept of association in in human pose estimation in videos, in accordance with an embodiment of the present invention.

FIG. 1A-FIG. 1D provides an abstract high-level illustration of the proposed method of the present invention which is focused on removing simple cycles from the commonly employed graph optimization framework for video based human pose estimation problems. The video based human poses are illustrated the video frames of FIG. JA. FIG. 1B illustrates a relational graph commonly known in the art in which each body part in each frame is represented by a node. Green and blue edges represent relationships between the different body parts in the same frame. Green edges are commonly used edges in the literature, blue edges are important edges for symmetric parts and red edges represent the consistency constraints for the same body part in adjacent frames. Note that FIG. 1B is for illustrative purposes and not all edges are shown. FIG. 1C illustrates the "abstraction" stage of the present invention, wherein symmetric parts are combined together and the simple cycles within each single frame are removed. FIG. 1D illustrates the "association" stages of the present invention, wherein the simple cycles between adjacent frames are removed.

In various embodiments, the present invention solves the problem of exploiting the spatial constraints between the body parts in each frame and temporal consistency throughout the frames, to the greatest possible extent, while also providing an efficient exact solution. Since it is known that the inference of a tree-based optimization problem has a polynomial time solution, the main issue solved by the present invention becomes is how to formulate the problem in order to model the useful spatial and temporal constraints between body parts among the frames without inducing simple cycles.

Figures 2A, 2B:
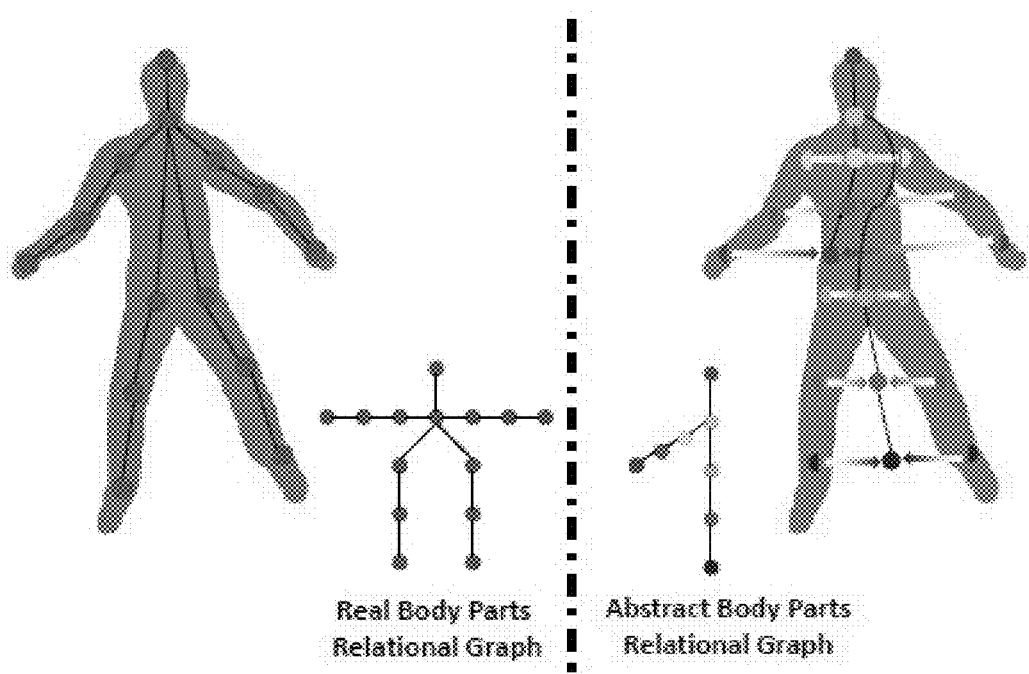
FIG. 2A is a diagram illustrating the real body parts used for human pose estimation is videos, in accordance with an embodiment of the present invention.
FIG. 2B is a diagram illustrating the abstract body parts used for human pose estimation is videos, in accordance with an embodiment of the present invention

To solve the problems known in the art, the present invention approximates the original fully connected model into a simplified tree-based model. In contrast with the standard tree representation of body parts, the present invention introduces a new concept, related to the use of abstract body parts and referred to as "abstraction", to conceptually combine the symmetric body parts. FIG. 2A and FIG. 2B illustrates the concept of real body parts vs. abstract body parts. FIG. 2A shows the commonly used body part definitions in the literature, in which these body parts, or nodes, represent real body parts (i.e. head, elbow, hip, etc.). The associated real body part relational graph is also illustrated in FIG. 2A. FIG. 2B shown the proposed new definition of body parts in accordance with the present invention, in which a pair of symmetric body parts are combined into one body part. These combined body parts (nodes) are referred to as abstract body parts, since the parts are some abstract concepts of parts, but not real body parts. The associated abstract body part graph is also illustrated in FIG. 2B. As such, the present invention takes advantage of the symmetric nature of the human body parts without inducing simple cycles into the formulation. In addition to the concept of "abstraction", the present invention also introduces the concept of "association", in which optimal tracklets are generated for each abstract body part to ensure the temporal consistency. Since each abstract body part is processed separately, it does not induce any temporal simple cycles into the graph. In view of these novel concepts, the present invention ensures both spatial and temporal constraints without inducing any simple cycles into the formulation and an exact solution can be efficiently found by dynamic programming.

Figures 3A, 3B, 3C, 3D, 3E, 3F:
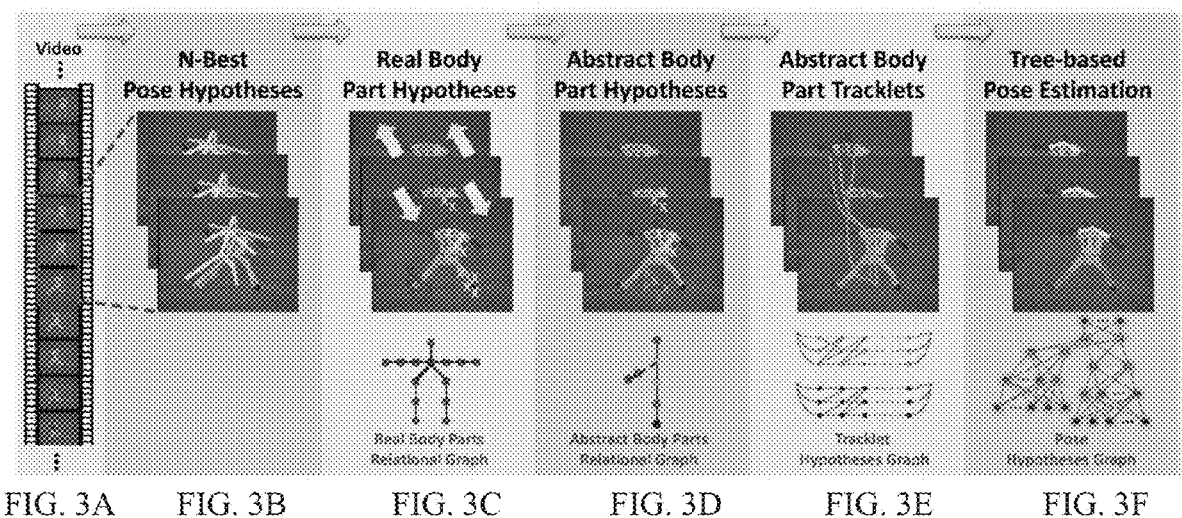
FIG. 3A shows the original video frames for which human poses are to be estimated.
FIG. 3B illustrates the N-Best method known in the art which is employed to generate a set of diverse poses for each single frame.
FIG. 3C illustrates that, by using the results from FIG. 3B, real body part hypotheses are generated for each body part in each frame and propagated to the adjacent frames.
FIG. 3D illustrates how real body parts are combined into abstract body parts and how the hypotheses are also combined, accordingly, in order to remove the intra-frame simple cycles (i.e. the simple cycles with blue and green edges in FIG. 1B).
FIG. 3E illustrates the tracklets that are generated for the abstract body parts (including single body parts and coupled body parts) using the abstract body part hypotheses generated in FIG. 3D.
FIG. 3F illustrates how the pose hypotheses graph is build, wherein each node is a tracklet corresponding to the abstract body part and the best post estimation is obtained by selecting the best hypotheses for the parts from the graph.

FIG. 3A-FIG. 3F provides an outline of the proposed method of the present invention for estimation human poses in unconstrained video. FIG. 3A show the original video frames. FIG. 3B illustrates the N-Best method known in the art which is employed to generate a set of diverse poses for each single frame. FIG. 3C illustrates that, by using the results from FIG. 3B, real body part hypotheses are generated for each body part in each frame and propagated to the adjacent frames. FIG. 3D illustrates how real body parts are combined into abstract body parts and how the hypotheses are also combined, accordingly, in order to remove the intra-frame simple cycles (i.e. the simple cycles with blue and green edges in FIG. 1B). FIG. 3E illustrates the tracklets that are generated for the abstract body parts (including single body parts and coupled body parts) using the abstract body part hypotheses generated in FIG. 3D. FIG. 3F illustrates how the pose hypotheses graph is build, wherein each node is a tracklet corresponding to the abstract body part and the best post estimation is obtained by selecting the best hypotheses for the parts from the graph.

In computer vision, and several other disciplines, many problems can be abstracted as follows. Assume there is a set of entities $\varepsilon = \{e^i|_{i=1}^N\}$, where each entity can only
be in one of the many states $S = \{s^k|_{k=1}^M\}$, with the unary scoring functions $\{\Phi(e^i, s^k)|e^i \in \varepsilon, s^k \in S\}$, which gives the likelihood that an entity $e^i$ is in state $s^k$. And there is a binary compatibility function for each pair of entities $\{\Psi(e^i, e^j, s^k, s^l)|e^i, e^j \in \varepsilon, s^k, s^l \in S\}$ which represents the compatibility of entity $e^i$ in state $s^k$ and entity $e^j$ in state $s^l$. The goal then is to determine the best states for each entity such that all of them have high unary scores and they are also compatible with each other. This problem can be modeled as a graph optimization problem formulated by relational and hypothesis graphs, which is described below.

Figure 5A:
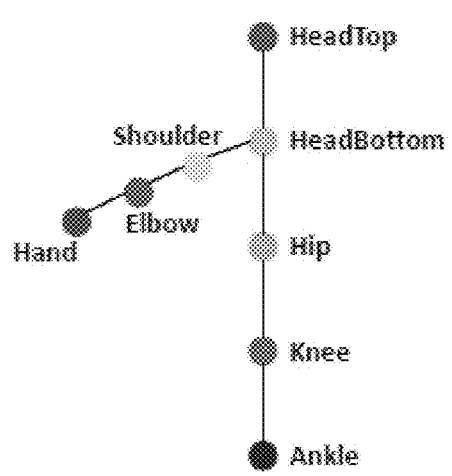
FIG. 5A illustrates the pose relational graph, in accordance with an embodiment of the present invention.
Figure 5B:
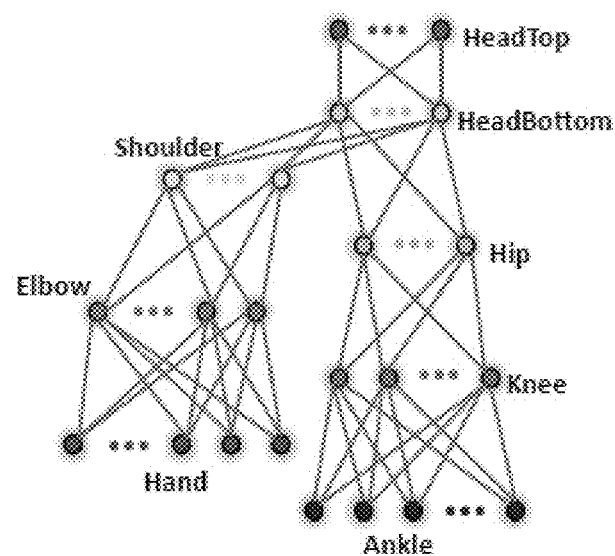
FIG. 5B illustrates the pose hypothesis graph, in accordance with an embodiment of the present invention.

A relational graph, $G_r = (V_r, E_r)$, represents the relationship of a set of entities which are represented by entity nodes $\{v_r^i|_{i=1}^{|V_r|}\}$, and the relationships between pairs of entities are represented by edges $E_r$. Examples of relational graphs are shown in FIG. 1A, FIG. 4A and FIG. 5A. More specifically, FIG. 5A is the pose relational graph, wherein each node represents one abstract body part and edges represent the relationship between the connected body parts. Corresponding to a relational graph $G_r$, a hypothesis graph $G_h = (V_h, E_h)$, can be built. For an entity node $v_r^i$ in $V_r$, a group of hypothesis nodes $V_{h(i)} = \{v_{h(i)}^k|_{k=1}^{|V_{h(i)}|}\}$ are generated to form the hypothesis graph, so $V_h = \cup_{i=1}^{|V_r|} V_{h(i)}$. The hypothesis nodes represent the possible states of each entity, and in the current context, they represent possible locations of body parts. Hypothesis edges, $E_h = \{(v_{h(i)}^k, v_{h(j)}^l)|v_{h(i)}^k \in V_{h(i)}, v_{h(j)}^l \in V_{h(j)}, v_r^i, v_r^j) \in E_r\}$, are built between each pair of hypothesis nodes from different groups following the structure of $G_r$. An unary weight, $\Phi$, can be assigned to each hypothesis node, which measures the likelihood of the corresponding entity to be in the state of this hypothesis node, and a binary weight, $\Psi$, can be assigned to each hypothesis edge, which measures the compatibility of the pair of hypothesis nodes connected by the edge. Examples of hypothesis graphs are shown in FIG. 4B, FIG. 4C and FIG. 5B. More specifically, FIG. 5B is the pose hypothesis graph, wherein each node is a tracklet for the part and edges represent the spatial compatibility of connected nodes. The methodology is to select one hypothesis node for each entity, in order to maximize the combined unary and binary weights. This is a graph optimization problem and the general form is NP-hard; however, if the relational graph is a tree (including the degenerate case of a single branch), the problem is not longer NP-hard and efficient dynamic programming based polynomial time solutions exist.

For a tree-based relational graph, $G_r$, and the corresponding hypothesis graph, $G_h$, the objective function for a set of arbitrary selected nodes $s=\{s^i|_{i=1}^{|V_r|}, s^i \epsilon V_h\}$ is:

$$\mathcal{M}(s) = \Sigma_{s^i \epsilon V_h} \Phi(s^i) + \lambda \cdot \Sigma_{(s^i, s^j) \epsilon E_h} \Psi(s^i, s^j), \qquad (1)$$

in which $\lambda$ is the parameter for adjusting the binary and unary weights and the goal is to maximize $\mathcal{M}(s)$: $s^* = \text{argmax}_s(\mathcal{M}(s))$. Letting the algorithm process from the leaf nodes to the root, and letting $$\mathcal{F}(i,k) = \Phi(v_{h(i)}^k) + \Sigma_{v_j \epsilon kids(v_i)} \max_l (\lambda \cdot \Psi(v_{h(i)}^k, v_{h(j)}^l) + \mathcal{F}(j,l)). \qquad (2)$$

Based on this recursive function, the problem can be solved efficiently by dynamic programming with a computation complexity of $\Theta(|V_r| \cdot N)$, in which N is the max number of hypotheses for each node in $V_r$.

In the present invention, the term "real body parts" is used to represent body parts which are commonly used in the literature. The term "abstract body parts" is a new concept introduced by the present invention to facilitate the formulation of the proposed method, as illustrated in FIG. 2B. In contrast to the real body part definitions, there are two types of abstract body parts introduced by the present invention, which include "single part" and "coupled part". Single parts include HeadTop and HeadBotom. Coupled parts include Shoulder, Elbow, Hand, Hip, Knee and Ankle. Note that, for coupled parts, one part is used to represent two symmetric real body parts. For instance, Ankle is employed to represent the abstract part which is actually the combination of the left and right ankles. The motivation of abstract body parts is to remove simple cycles in the body part relational graph while at the same time maintaining the ability of modeling the symmetric body parts. For example, as shown in FIG. 1B, in each frame, the green and blue edges are used to model the body part relationships and at the same time there are many simple cycles in a give frame. After introducing the abstract body parts, as shown in FIG. 1C, the symmetric parts are combined, and as a result, none of the frames contain simple cycles. However, there are still simple cycles between frames, which will be handled by the abstract body part tracklets discussed below.

A known human pose estimation approach can be applied to each video frame to generate N best full body pose hypotheses. N is usually a large number (normally N>300) and for each real body part, the body part hypotheses are body part locations extracted from the-best poses. The body part hypotheses are sampled by an iterative, non-maximum suppression (NMS) scheme based on the detection score map. Detection score is a combination of max-marginal and foreground score, $$\Phi_s(p) = \alpha \Phi_M(p) + (1-\alpha)\Phi_F(p), \qquad (3)$$

in which $\Phi_s$ is the detection score, $\Phi_M$ is the max-marginal, $\Phi_F$ is the foreground score obtained by the background subtraction, and p is the location of the body part.

The abstract body part hypotheses for a single part are the same as its corresponding real body part hypotheses and the abstract body part hypotheses for a coupled part are the permutation of its corresponding left and right body part hypotheses.

Based on the abstract body part hypotheses described above, the goal is to obtain several best single part and coupled part tracklets through the video frames. The problem is now to select one hypothesis from each frame, ensuring that they have high detection scores and are consistent throughout the frames. Following the definitions previously discussed, the relational graph for this problem is shown in FIG. 4A and the hypothesis graphs for single parts and coupled parts are shown in FIG. 4B and FIG. 4C, respectively. FIG. 4A shows the relational graph for the abstract body part tracklet generation. FIG. 4B shows the tracklet hypothesis graph for single body parts, wherein each node represents on hypothesis location of the body part in a specific frame and edges shown the similarity between the connect body part hypotheses in adjacent frames. FIG. 4C shows the tracklet hypothesis graph for coupled parts, wherein each node represents a coupled body part hypothesis, which is the combination of the corresponding symmetric body parts, which are represented by each node being colored into two halves. The edges represent the similarities between connected coupled body parts in adjacent frames. Note that FIG. 4B and FIG. 4C are only illustrations, and for simplicity, not all edges are shown.

Based on the single part hypotheses, a single part tracklet hypothesis graph is built, as shown in FIG. 4B, for each single part (HeadTop and HeadBottom). In this graph, each node represents a single part hypothesis and the detection score $\Phi_s(p)$ is used to assign the node a unary weight. Edges are added between every pair of nodes from the adjacent frames. Binary weights are assigned to the edges which represent similarities between hypotheses in adjacent frames. The binary weight is defined as a combination of optical flow predicted location distance and the Chi-square distance of HOG (histogram of oriented gradients) features as follows:

$$\Psi_s(p^f, p^{f+1}) = \exp\left(-\frac{\chi^2\left(\Upsilon(p^f), \Upsilon(p^{f+1}) \cdot \left\|\hat{p}^f - p^{f+1}\right\|_2^2\right)}{\sigma^2}\right) \qquad (4)$$

where $p^f$ and $p^{f+1}$ are two arbitrary hypotheses from frames f and f+1, $\gamma(p)$ is the optical flow predicted location p, $\hat{p}^f$ is the optical flow predicted location for $p^f$ and f+1, and $\sigma$ is a parameter. The goal is to select one node from each frame to maximize the overall combined unary and binary weights. Given an arbitrary selection of nodes from the graph $s_s = \{s_s^i|_{i=1}^F\}$, wherein F is the number of frames, the objective function is given by:

$$\mathcal{M}_s(s_s) = \Sigma_{i=1}^F \Phi_s(s_s^i) + \lambda_s \cdot \Sigma_{i=1}^F \Psi_s(s_s^i, s_s^{i+1}), \qquad (5)$$

where $\lambda_s$ is the parameter for adjusting the binary and unary weights and $s_s^* = \text{argmax}_{s_s}(\mathcal{M}_s(s_s))$ gives the optimal solution. It is clear that the relational graph of this problem is a degenerate tree (i.e. single branch tree), as shown in FIG. 4A. As such, the problem can be solved using dynamic programming efficiently. After the optimal solution is obtained, the selected nodes are removed from the graph and the next optimal solution can be obtained. This process can be iterated over multiple times in order to get several tracklets from the graph.

The relational graph for the coupled part tracklets generation is the same as for the single part; however, the nodes and edges are defined differently. In this case, each hypothesis node is composed of the locations of a pair of symmetric parts (e.g. left and right ankles). FIG. 4C shows an illustration of the relational graph for the coupled parts. Such a design aims to model the symmetric relationship between coupled parts, including mutual location exclusions and appearance similarity in order to reduce double counting. As discovered in previous research, double counting is a key issue which severely hinders the pose estimation. Theoretically, tree based models lack the ability to model spatial relationship of the coupled parts (e.g. left and right ankles). Furthermore, as previously discussed, attempting to model such spatial relationships would inevitably induce simple cycles in the graph, which would severely increase the computational complexity. The present invention introduces the idea of coupled parts to effectively address this issue. In the coupled part tracklet hypothesis graph, each node r=(p, q) represents a composition of a pair of symmetric parts p and q. Unary weights are assigned to the nodes which represent the detection confidence and the compatibility between the two symmetric parts, and the weight is defined as:

$$\Psi_c(r) = \frac{(\Phi_s(r.p) + \Phi_s(r.q)) \cdot (\Lambda(r.p)^T \cdot \Lambda(r.q))}{1 + e^{|r.p-r.q|/\theta}}, \quad (6)$$

where $\Phi_s$ is from Eq. 3, and wherein, r.p and r.q respectively represent the left and right components of the coupled part r, $\Lambda(p)$ is the normalized color histogram of a local patch around p, the denominator is the inverse sigmoid function which penalizes the overlap of the symmetric parts, and $\theta$ is the parameter that controls the penalty. The binary weights of the edges are computed as:

$$\Psi_c(r^i, r^{i+1}) = \Psi_s(r.p^i, r.p^{i+1}) + \Psi_s(r.q^i, r.q^{i+1}), \quad (7)$$

where $\Psi_s$ is from Eq. 4.

Similarly, the goal is to select one node (which is a composition of a pair of symmetric parts) from each frame to maximize the overall combined unary and binary weights. Given an arbitrary selection of nodes from the graph $s_c = \{s_c^i|_{i=1}^F\}$ (where F is the number of frames), the objective function is:

$$\mathcal{M}_c(s_c) = \Sigma_{i=1}^F \Phi_c(s_c^i) + \lambda_c \cdot \Sigma_{i=1}^F \Psi_c(s_c^i, s_c^{i+1}), \quad (8)$$

where $\lambda_c$ is the parameter to adjust the binary and unary weights and $s_c^* = \text{argmax}_{s_c}(\mathcal{M}_c(s_c))$ gives the optimal solution. As previously discussed, the problem can also be solved by dynamic programming efficiently and iterated for multiple times to generate several tracklets.

After the best tracklets for each of the abstract body parts are obtained by the methods previously described, the next step is to select the best tracklets that are compatible. The relational graph $G_T = (V_T, E_T)$, for this final tracklet based optimal pose estimation, is shown in FIG. 5A, wherein each node represents an abstract body part and the edges model the spatial relationship between them. Following the definitions of the abstract body parts and using the part tracklets generated for these abstract body parts, a pose hypothesis graph can be build to get the optimal pose, as shown in FIG. 5B. In the hypothesis graph of FIG. 5B, each node represents an abstract body part tracklet and edges represent the spatial constraints. For each hypothesis tracklet node, s, depending on it if corresponds to a single part of a coupled part $E_s(s)$ from Eq. 5 or $E_c(s)$ from Eq. 8 is used as its unary weight $\Phi_T(S)$. Let $\Psi_d(p_i, q_j) = w_{i,j} \cdot \psi(p_i - q_j)$ be the relative location score ($w_{i,j}$ and $\psi$ are defined in the current state of the art), the binary weight between a pair of adjacent single part tracklet nodes $s_s = \{s_s^i|_{i=1}^F\}$ and $t_s = \{t_s^i|_{i=1}^F\}$ is:

$$\Psi_T(s_s, t_s) = \Sigma_{i=1}^F \Psi_d(s_s^i, t_s^i) \quad (9)$$

the binary weight between a single part tracklet node $s_s = \{s_s^i|_{i=1}^F\}$ and an adjacent coupled part tracklet node $t_c = \{t_c^i|_{i=1}^F\}$ is:

$$\Psi_T(s_s, t_c) = \Sigma_{i=1}^F (\Psi_d(s_s^i, t_c^i \cdot p) + \Psi_d(s_s^i, t_c^i \cdot q)) \quad (10)$$

and the binary weight between a pair of adjacent coupled tracklet nodes $s_c = \{s_c^i|_{i=1}^F\}$ and $t_c = \{t_c^i|_{i=1}^F\}$ is:

$$\Psi_T(s_c, t_c) = \Sigma_{i=1}^F (\Psi_d(s_c^i \cdot p, t_c^i \cdot p) + \Psi_d(s_c^i \cdot q, t_c^i \cdot q)). \quad (11)$$

Now, the goal is to select only one tracklet for each abstract body part in order to maximize the combined unary (detection score) and binary (compatible score) weights. Given an arbitrary tree selected from the hypothesis graph $s_T = \{s_T^i|_{i=1}^{|V_T|}\}$, the objective function is given by:

$$\mathcal{M}_T(s_T) = \Sigma_{v_T^i \in V_T} \Phi_T(s_T^i) + \lambda_T \cdot \Sigma_{(v_T^i, v_T^j) \in E_T} \Psi_T(s_T^i, s_T^j), \quad (12)$$

where $\lambda_T$ is a parameter for adjusting the binary and unary weights and the optimal solution, $s_T^* = \text{argmax}_{s_T}(\mathcal{M}_T(s_T))$, can also be obtained by the dynamic programming algorithm efficiently. The body part locations in each frame are extracted from this final optimal solution.

In one embodiment, the system of the present invention may include various software programs and associated hardware components, such as a central processing unit (CPU) and associated memory. In an exemplary embodiment of the present invention, 15 consecutive video frames were analyzed each time. For Eq. 5 and Eq. 5, the unary and binary weights were normalized for each from between 0 and 1. In Eq. 3, $\alpha = 0.5$ and $\lambda_c = \lambda_s = \lambda_T = 1$ for Eq. 5, Eq. 8 and Eq. 12. For $\sigma$ Eq. 5 and $\theta$ in Eq. 6, 10% of the median height (normally 15-30 pixels) of N-Best poses was used. For each real body part, 20 hypotheses were generated and for each abstract body part, the top 10 tracklets were selected.

In the present invention, a tree-based optimization method for human pose estimation in videos is provided. The main contribution of the invention is focused on reformulating the problem to remove the simple cycles from the relational graph, while at the same time maintaining the useful connections to the greatest possible extent, in order to transform the original NP-hard problem into a simpler tree-based optimization problem, for which an exact solution exists and which can be solved efficiently. The method of the present invention is general and has potential to be employed in solving other problems in computer vision.

The present invention has improved performance over current human pose estimation methods in videos currently known in the art. The method and associated software-executed algorithm of the present invention has lower computational complexity. As compared to the depth sensor based systems of the prior art, the present invention has broader application in the field of video estimation as a result of the ability to utilize a regular video camera, thereby eliminating the depth sensor requirement. In addition, the present invention also reduces the required equipment cost since video cameras are much cheaper than video systems incorporating depth sensor technology.

The present invention has tremendous commercial value in the computer/digital gaming industry and also in the public surveillance industry. For the gaming companies, they can directly integrate the present inventive method into their new games and attract new customers by this improved user experience. Additionally, video camera producers can incorporate the inventive technology directly into the cameras, thereby creating a competitive advantage over other camera producers.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for estimating human poses in an unconstrained video, the method comprising:
   receiving, at a computing device comprising hardware components and software programs, an unconstrained video comprising a plurality of consecutive frames including at least one human pose;
   generating a plurality of best full body pose hypotheses for each of the plurality of consecutive frames;
   extracting a plurality of real body part nodes from each of the plurality of best full body pose hypotheses;
   extracting a plurality of real body part nodes from each of the plurality of best full body pose hypotheses in each of the plurality of consecutive frames of the unconstrained video;
   generating a real body part hypotheses for each of the plurality of real body part nodes extracted from the plurality of best full body pose hypotheses;
   combining one or more pairs of symmetric real body part nodes into a single abstract coupled body part node to generate a plurality of abstract coupled body part nodes for each of the plurality of consecutive frames of the unconstrained video, wherein each of the one or more pairs of symmetric real body part nodes includes a left real body part node of the at least one human pose and a corresponding symmetric right real body part node of the at least one human pose;
   generating a plurality of abstract body part hypotheses from the plurality of abstract coupled body part nodes and each of the real body part hypotheses;
   generating an optimal tracklet for each of the abstract body part hypotheses; and
   estimating a human pose in the unconstrained video based upon the abstract body part tracklets using tree-based optimization.

2. The method of claim 1, wherein generating a plurality of best full body pose hypotheses for each of the plurality of consecutive frames, further comprising generating a plurality of best full body pose hypotheses using an N-best inference algorithm.

3. The method of claim 1, wherein the real body part nodes are selected from head, neck, right elbow, left elbow, right wrist, left wrist, right hip, left hip, right knee, left knee, right foot and left foot.

4. The method of claim 1, wherein the abstract body part nodes include abstract single body part nodes.

5. The method of claim 4, wherein the abstract single body part nodes include, head top and head bottom.

6. The method of claim 1, wherein the abstract coupled body part nodes include one or more of, right shoulder combined with left shoulder, right elbow combined with left elbow, right wrist combined with left wrist, right hip combined with left hip, right knee combined with left knee and right ankle combined with left ankle.

7. The method of claim 1, wherein generating an optimal tracklet for each of the abstract body part hypotheses further comprises selecting the one tracklet for each of the abstract body parts that maximizes a combined detection score and compatible score weights.

8. A system for estimating human poses in an unconstrained video, the system comprising:
   at least one computing device comprising hardware components and software programs for;
      receiving an unconstrained video comprising a plurality of consecutive frames including at least one human pose;
      generating a plurality of best full body pose hypotheses for each of the plurality of consecutive frames;
      extracting a plurality of real body part nodes from each of the plurality of best full body pose hypotheses in each of the plurality of consecutive frames of the unconstrained video;
      generating a real body part hypotheses for each of the plurality of real body part nodes extracted from the plurality of best full body pose hypotheses;
      combining one or more pairs of symmetric real body part nodes into a single abstract coupled body part node to generate a plurality of abstract coupled body part nodes for each of the plurality of consecutive frames of the unconstrained video, wherein each of the one or more pairs of symmetric real body part nodes includes a left real body part node of the at least one human pose and a corresponding symmetric right real body part node of the at least one human pose;
      generating a plurality of abstract body part hypotheses from the plurality of abstract coupled body part nodes and each of the real body part hypotheses;
      generating an optimal tracklet for each of the abstract body part hypotheses; and
      estimating a human pose in the unconstrained video based upon the abstract body part tracklets using tree-based optimization.

9. The system of claim 8, wherein the system further includes software programs for generating a plurality of best full body pose hypotheses for each of the plurality of consecutive frames, further comprising generating a plurality of best full body pose hypotheses using an N-best inference algorithm.

10. The system of claim 8, wherein the real body part nodes are selected from head, neck, right elbow, left elbow, right wrist, left wrist, right hip, left hip, right knee, left knee, right foot and left foot.

11. The system of claim 8, wherein the abstract body part nodes include abstract single body part nodes.

12. The system of claim 11, wherein the abstract single body part nodes include, head top and head bottom.

13. The system of claim 8, wherein the abstract coupled body part nodes include one or more of, right shoulder combined with left shoulder, right elbow combined with left elbow, right wrist combined with left wrist, right hip combined with left hip, right knee combined with left knee and right ankle combined with left ankle.

14. The system of claim 1, wherein the system is integrated into a gaming system or a camera.

15. One or more non-transitory computer-readable media having computer-executable instructions for performing a method of running a software program on a computing device, the computing device operating under an operating system, the method including issuing instructions from the software program comprising:
   receiving an unconstrained video comprising a plurality of consecutive frames including at least one human pose;
   generating a plurality of best full body pose hypotheses for each of the plurality of consecutive frames;
   extracting a plurality of real body part nodes from each of the plurality of best full body pose hypotheses in each of the plurality of consecutive frames of the unconstrained video;
   generating a real body part hypotheses for each of the plurality of real body part nodes extracted from the plurality of best full body pose hypotheses;
   combining one or more pairs of symmetric real body part nodes into a single abstract coupled body part node to generate a plurality of abstract coupled body part nodes for each of the plurality of consecutive frames of the unconstrained video, wherein each of the one or more pairs of symmetric real body part nodes includes a left real body part node of the at least one human pose and a corresponding symmetric right real body part node of the at least one human pose;
   generating a plurality of abstract body part hypotheses from the plurality of abstract coupled body part nodes and each of the real body part hypotheses;
   generating an optimal tracklet for each of the abstract body part hypotheses; and
   estimating a human pose in the unconstrained video based upon the abstract body part tracklets using tree-based optimization.

16. The media of claim 15, wherein generating a plurality of best full body pose hypotheses for each of the plurality of consecutive frames, further comprising generating a plurality of best full body pose hypotheses using an N-best inference algorithm.

17. The media of claim 15, wherein the real body part nodes are selected from head, neck, right elbow, left elbow, right wrist, left wrist, right hip, left hip, right knee, left knee, right foot and left foot.

18. The media of claim 15, wherein the abstract body part nodes include abstract single body part nodes.

19. The media of claim 18, wherein the abstract single body part nodes include, head top and head bottom.

20. The media of claim 15, wherein the abstract coupled body part nodes include one or more of, right shoulder combined with left shoulder, right elbow combined with left elbow, right wrist combined with left wrist, right hip combined with left hip, right knee combined with left knee and right ankle combined with left ankle.

* * * * *